United States Patent
Fujita et al.

(10) Patent No.: US 11,631,867 B2
(45) Date of Patent: Apr. 18, 2023

(54) BIPOLAR PLATE, CELL FRAME, CELL STACK AND REDOX FLOW BATTERY

(71) Applicant: Sumitomo Electric Industries, Ltd., Osaka (JP)

(72) Inventors: Hayato Fujita, Osaka (JP); Kenji Motoi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 9 days.

(21) Appl. No.: 16/479,446

(22) PCT Filed: Jan. 19, 2017

(86) PCT No.: PCT/JP2017/001826
§ 371 (c)(1),
(2) Date: Jul. 19, 2019

(87) PCT Pub. No.: WO2018/134956
PCT Pub. Date: Jul. 26, 2018

(65) Prior Publication Data
US 2019/0379062 A1    Dec. 12, 2019

(51) Int. Cl.
*H01M 8/026* (2016.01)
*H01M 8/0273* (2016.01)
*H01M 8/18* (2006.01)

(52) U.S. Cl.
CPC ......... *H01M 8/026* (2013.01); *H01M 8/0273* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 2002/0127457 A1* | 9/2002 | Trapp | H01M 8/0226 451/36 |
| 2010/0297520 A1* | 11/2010 | Wenzl | H01M 8/0202 |
| 2011/0183228 A1* | 7/2011 | Shirvanian | H01M 8/04231 72/352 |

(Continued)

FOREIGN PATENT DOCUMENTS

| | | |
|---|---|---|
| CN | 103178275 A | 6/2013 |
| JP | H8-96820 A | 4/1996 |

(Continued)

OTHER PUBLICATIONS

WO-2016001400-A—machine translation (Year: 2016).*
Slantineanu. "Surface Roughness at Aluminium Parts Sand Blasting" (Year: 2011).*

*Primary Examiner* — Haroon S. Sheikh
(74) *Attorney, Agent, or Firm* — Baker Botts L.L.P.; Michael A. Sartori

(57) ABSTRACT

A bipolar plate is disposed between a positive electrode and a negative electrode of a redox flow battery. The bipolar plate has, in a surface of the bipolar plate facing at least one of the positive electrode and the negative electrode, a plurality of grooves through which an electrolyte flows and a ridge positioned between the adjacent grooves. The bipolar plate includes rough surfaces which are disposed in at least parts of groove inner surfaces defining the respective grooves and surface roughness of which represented by arithmetic mean roughness Ra is 0.1 μm or larger.

11 Claims, 9 Drawing Sheets

(56) References Cited

U.S. PATENT DOCUMENTS

| | | | |
|---|---|---|---|
| 2013/0157166 A1 | 6/2013 | Tsai et al. | |
| 2018/0190999 A1* | 7/2018 | Fujita | H01M 8/188 |
| 2018/0205067 A1* | 7/2018 | Markiewicz | H01M 8/0234 |
| 2018/0277858 A1* | 9/2018 | Fujita | H01M 8/0258 |
| 2020/0075968 A1* | 3/2020 | Ichikawa | H01M 8/10 |

FOREIGN PATENT DOCUMENTS

| | | | | |
|---|---|---|---|---|
| JP | 2015-122230 A | 7/2015 | | |
| JP | 2015-122231 A | 7/2015 | | |
| JP | 2015-138771 A | 7/2015 | | |
| JP | 2015-210849 A | 11/2015 | | |
| WO | WO-2015111313 A1 * | 7/2015 | | H01M 8/188 |
| WO | 2016/001400 A1 | 1/2016 | | |
| WO | WO-2016001400 A1 * | 1/2016 | | C23C 4/08 |
| WO | 2016/208482 A1 | 12/2016 | | |

* cited by examiner

BIPOLAR PLATE, CELL FRAME, CELL STACK AND REDOX FLOW BATTERY

TECHNICAL FIELD

The present invention relates to a bipolar plate, a cell frame, a cell stack, and a redox flow battery.

BACKGROUND ART

PTLs 1 to 4 disclose redox flow batteries. Each of these redox flow batteries includes, as a main element, a battery cell that includes a positive electrode to which a positive electrolyte is supplied, a negative electrode to which a negative electrolyte is supplied, and a membrane interposed between the positive electrode and the negative electrode. The positive electrolyte is supplied to the positive electrode and the negative electrolyte is supplied to the negative electrode so as to charge and discharge the redox flow battery. The battery cell is configured by disposing a set of cell frames such that a layered member including the positive electrode, the membrane, and the negative electrode are interposed between the cell frames. Each of the cell frames includes a bipolar plate and a frame body. The positive electrode and the negative electrode are disposed on front and rear surfaces of the bipolar plate. The frame body is provided at an outer periphery of the bipolar plate.

PTLs 1 to 4 disclose respective bipolar plates. Each of these bipolar plates has a plurality of grooves through which the electrolytes flow so as to sufficiently distribute the electrolytes to the positive electrodes and the negative electrodes in the battery cell.

CITATION LIST

Patent Literature

PTL 1: Japanese Unexamined Patent Application Publication No. 2015-122230
PTL 2: Japanese Unexamined Patent Application Publication No. 2015-122231
PTL 3: Japanese Unexamined Patent Application Publication No. 2015-138771
PTL 4: Japanese Unexamined Patent Application Publication No. 2015-210849

SUMMARY OF INVENTION

A bipolar plate according to the present disclosure is disposed between a positive electrode and a negative electrode of a redox flow battery.

The bipolar plate has, in a surface of the bipolar plate facing at least one of the positive electrode and the negative electrode, a plurality of grooves through which an electrolyte flows and a ridge positioned between the adjacent grooves.

The bipolar plate includes rough surfaces which are disposed in at least parts of groove inner surfaces defining the respective grooves and surface roughness of which represented by arithmetic mean roughness Ra is 0.1 μm or larger.

A cell frame according to the present disclosure includes the bipolar plate according to the present disclosure and a frame body provided at an outer periphery of the bipolar plate.

A cell stack according to the present disclosure includes the cell frame according to present disclosure.

A redox flow battery according to the present disclosure includes the cell stack according to the present disclosure.

DESCRIPTION OF EMBODIMENTS

Figure 1:
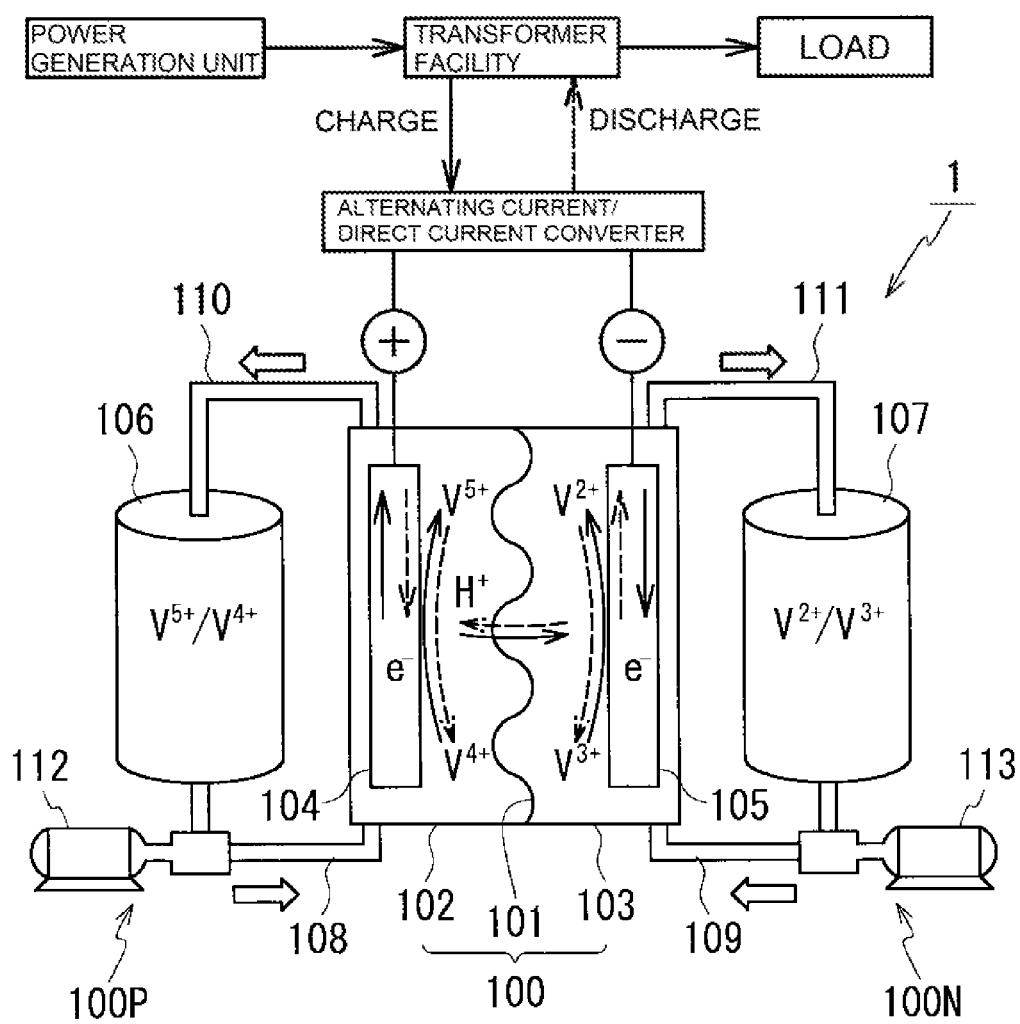
FIG. 1 illustrates an operating principle of a redox flow battery according to a first embodiment.

Problems to be Solved by Present Disclosure

Flows of an electrolyte in a bipolar plate having a plurality of grooves include flows along the grooves and flows crossing ridges positioned between the adjacent grooves so as to move between the grooves. Most of the outermost surface of the bipolar plate is formed by the ridges. Thus, the electrolyte flowing such that the electrolyte crosses the ridges easily penetrates into an electrode facing the ridges, and accordingly, battery reaction is easily performed in the electrode. Meanwhile, out of the electrolyte flowing along the grooves, part of the electrolyte flowing near the bottoms of the grooves is unlikely to penetrate into the electrode and may be discharged in an unreacted state without being used for battery reaction.

Accordingly, one of the objects of the present disclosure is to provide a bipolar plate, a cell frame, a cell stack, and a redox flow battery with which good diffusion of an electrolyte is obtained and which can improve battery reactivity.

Advantageous Effects of Present Disclosure

According to the present disclosure, the bipolar plate, the cell frame, the cell stack, and the redox flow battery with which good diffusion of an electrolyte is obtained and which can improve battery reactivity can be provided.

Description of Embodiments According to the Present Invention

First, items of the content of embodiments according to the present invention are listed and described.

(1) A bipolar plate according to an embodiment of the present invention is disposed between a positive electrode and a negative electrode of a redox flow battery.

The bipolar plate has, in a surface of the bipolar plate facing at least one of the positive electrode and the negative electrode, a plurality of grooves through which an electrolyte flows and a ridge positioned between the adjacent grooves.

The bipolar plate includes rough surfaces which are disposed in at least parts of groove inner surfaces defining the respective grooves and surface roughness of which represented by arithmetic mean roughness Ra is 0.1 μm or larger.

The bipolar plate includes the rough surfaces with the arithmetic mean roughness Ra of 0.1 μm or larger in the groove inner surfaces defining the grooves. Thus, the flow rate of the electrolyte varies due to small level differences of the rough surfaces when the electrolyte flows along the grooves. This can generate turbulence in the electrolyte. The occurrences of turbulence in the electrolyte can improve diffusion of the electrolyte flowing along the grooves, and the electrolyte flowing near the bottoms of the grooves is also easily supplied to the electrode. Thus, since the electrolyte flowing along the grooves is supplied to and penetrates into the electrode, battery reactivity can be improved, and discharge of the electrolyte in an unreacted state can be suppressed.

(2) An example of the bipolar plate can be a form in which the surface roughness of the rough surfaces represented by the arithmetic mean roughness Ra is 25 μm or smaller.

The electrode disposed on the surface of the bipolar plate typically includes a porous material including fiber. When the bipolar plate includes the rough surfaces, the fiber included in the electrode is easily caught on the small level differences of the rough surfaces. When the electrode is compressed due to a pressure difference between the polarities, the electrode enters the grooves in the case where the fiber of the electrode is caught on the insides of the grooves. This reduces the volume of the grooves and increases pressure loss. Meanwhile, when the surface roughness of the rough surfaces represented by the arithmetic mean roughness Ra is 25 μm or smaller, the likelihood of the fiber of the electrode being caught on the insides of the grooves can reduce. This allows the volume of the grooves to be easily ensured and the increase in pressure loss to be suppressed. Furthermore, when the surface roughness of the rough surfaces represented by the arithmetic mean roughness Ra is 25 μm or smaller, even in the case where the fiber of the electrode is caught on the insides of the grooves during the assembly of a battery cell, the caught fiber is easily released. Furthermore, when the surface roughness of the rough surface represented by the arithmetic mean roughness Ra is 25 μm or smaller, an increase in flow resistance of the electrolyte flowing along the grooves can be suppressed, and an increase in temperature of the electrolyte due to frictional heat generated between the electrolyte and the rough surfaces can also be suppressed.

(3) An example of the bipolar plate can be a form in which the bipolar plate further includes a rough surface which is disposed in at least part of a surface of the ridge and surface roughness of which represented by the arithmetic mean roughness Ra is 0.1 μm or larger.

When the ridge, in addition to the grooves, is provided with the rough surface, turbulence can also be generated in the electrolyte flowing such that the electrolyte crosses the ridge, and diffusion of the electrolyte into the electrode facing the ridge can be improved. Thus, battery reactivity can be further improved. Furthermore, when the rough surfaces are provided in the entirety of the grooves and the ridge, the rough surfaces are easily formed in the bipolar plate.

(4) A cell frame according to an embodiment of the present invention includes the bipolar plate according to any one of (1) to (3) described above and a frame body provided at an outer periphery of the bipolar plate.

The cell frame includes the bipolar plate according to the embodiment of the present invention. Thus, the electrolyte flowing along the grooves is supplied to and penetrates into the electrode easily, and accordingly, battery reactivity can be improved.

(5) A cell stack according to an embodiment of the present invention includes the cell frame according to (4) described above.

The cell stack includes the cell frame according to the embodiment of the present invention. Thus, the electrolyte flowing along the grooves is supplied to and penetrates into the electrode easily, and accordingly, battery reactivity can be improved.

(6) A redox flow battery according to an embodiment of the present invention includes the cell stack according to (5) described above.

The redox flow battery includes the cell stack according to the embodiment of the present invention. Thus, the electrolyte flowing along the grooves is supplied to and penetrates into the electrode easily, and accordingly, battery reactivity can be improved.

Details of the Embodiments According to the Present Invention

The details of the bipolar plate, the cell frame, the cell stack, and the redox flow battery according to the embodiments of the present invention are described below with reference to the drawings. The same reference numerals in the drawings denote elements of the same names. It should be noted that the present invention is not limited to these examples. The present invention is indicated by the scope of Claims and is intended to embrace all the modifications within the scope of Claims and within meaning and scope of equivalency.

First Embodiment

One of the characteristics of the present embodiment is that the bipolar plate has a structure with which good diffusion of the electrolyte is obtained and which can improve the battery reactivity. Hereinafter, first, basic structures of the redox flow battery, the cell stack, and the cell frame according to a first embodiment are described with reference to FIGS. 1 to 4. After that, the structure of the bipolar plate included in the cell frame (cell stack, redox flow battery) according to the first embodiment is described in detail with reference to FIGS. 4 and 5.

[RF Battery]

Typically, as illustrated in FIG. 1, a redox flow battery (RF battery) 1 is connected via, for example, an alternating current/direct current converter and a transformer facility, to a power generation unit and a load such as a power system or consumer. The RF battery 1 is charged with the power generation unit as a power supply source and is discharged with a load as a power consuming target. Examples of the power generation unit include, for example, a photovoltaic power generator, a wind power generator, and another ordinary power plant.

The RF battery 1 includes a battery cell 100 that is separated into a positive electrode cell 102 and a negative electrode cell 103 by a membrane 101. The positive electrode cell 102 includes therein a positive electrode 104 to which a positive electrolyte is supplied. The negative electrode cell 103 includes therein a negative electrode 105 to which a negative electrolyte is supplied. The positive electrode 104 and the negative electrode 105 are reaction fields where battery reaction is performed by active material ions contained in the electrolytes supplied thereto. The membrane 101 serves as a thin membrane member that separates the positive electrode 104 and the negative electrode 105 from each other and that is permeable to specified ions.

A positive electrolyte circulation mechanism 100P that supplies the positive electrolyte by circulation to the positive electrode cell 102 includes a positive electrolyte tank 106, pipes 108, 110, and a pump 112. The positive electrolyte tank 106 stores the positive electrolyte. The pipes 108, 110 connect the positive electrolyte tank 106 and the positive electrode cell 102 to each other. The pump 112 is provided in the pipe 108 disposed on the upstream side (supply side). A negative electrolyte circulation mechanism 100N that supplies the negative electrolyte by circulation to the negative electrode cell 103 includes a negative electrolyte tank 107, pipes 109, 111, and a pump 113. The negative electrolyte tank 107 stores the negative electrolyte. The pipes 109, 111 connect the negative electrolyte tank 107 and the negative electrode cell 103 to each other. The pump 113 is provided in the pipe 109 disposed on the upstream side (supply side).

Figure 2:
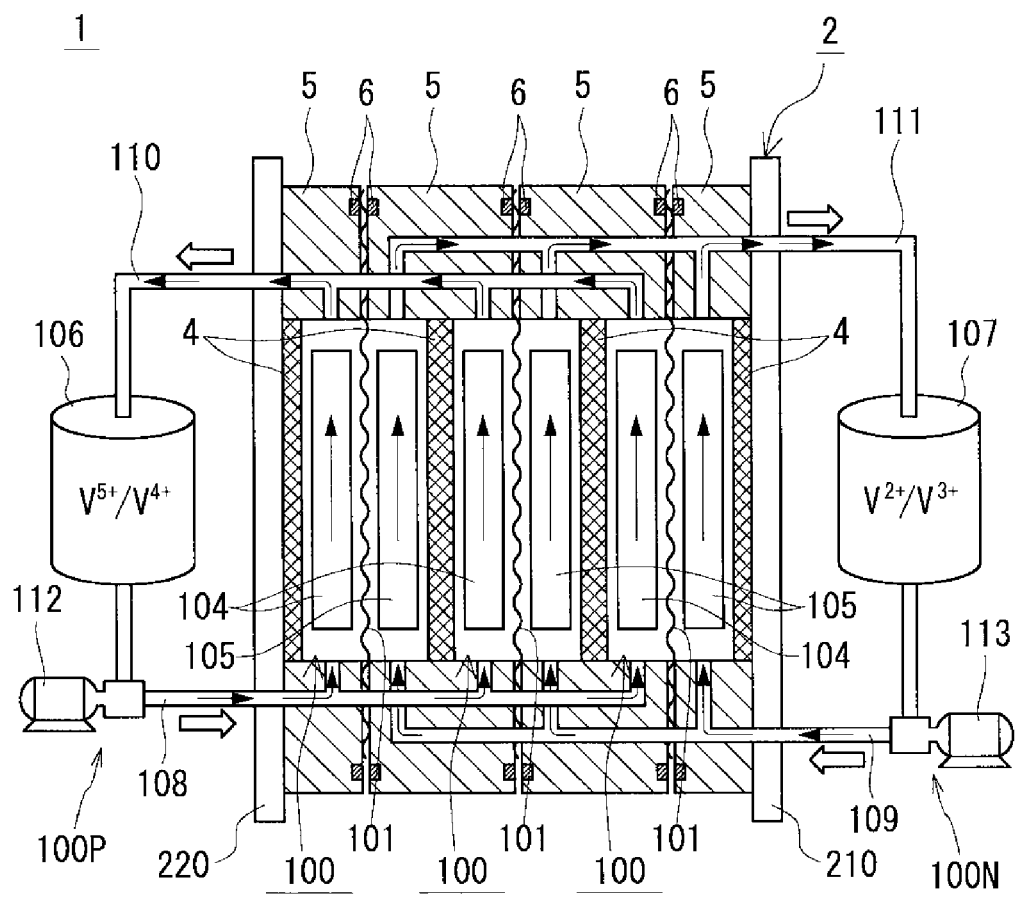
FIG. 2 is a schematic structural view of the redox flow battery according to the first embodiment.

The positive electrolyte is supplied from the positive electrolyte tank 106 to the positive electrode 104 through the pipe 108 on the upstream side and returned from the positive electrode 104 to the positive electrolyte tank 106 through the pipe 110 on the downstream side (discharge side). Furthermore, the negative electrolyte is supplied from the negative electrolyte tank 107 to the negative electrode 105 through the pipe 109 on the upstream side and returned from the negative electrode 105 to the negative electrolyte tank 107 through the pipe 111 on the downstream side (discharge side). The positive electrolyte and the negative electrolyte are respectively supplied to the positive electrode 104 and the negative electrode 105 by circulation of the positive electrolyte and the negative electrolyte. Thus, the active material ions in the positive electrolyte and the negative electrolyte undergo valence-change reactions, so that the RF battery 1 is charged and discharged. Referring to FIGS. 1 and 2, vanadium ions illustrated in the positive electrolyte tank 106 and the negative electrolyte tank 107 exemplify ion species contained as the active materials in the positive electrolyte and the negative electrolyte. In FIG. 1, solid arrows indicate charge and dotted arrows indicate discharge.

[The Cell Stack]

Figure 3:
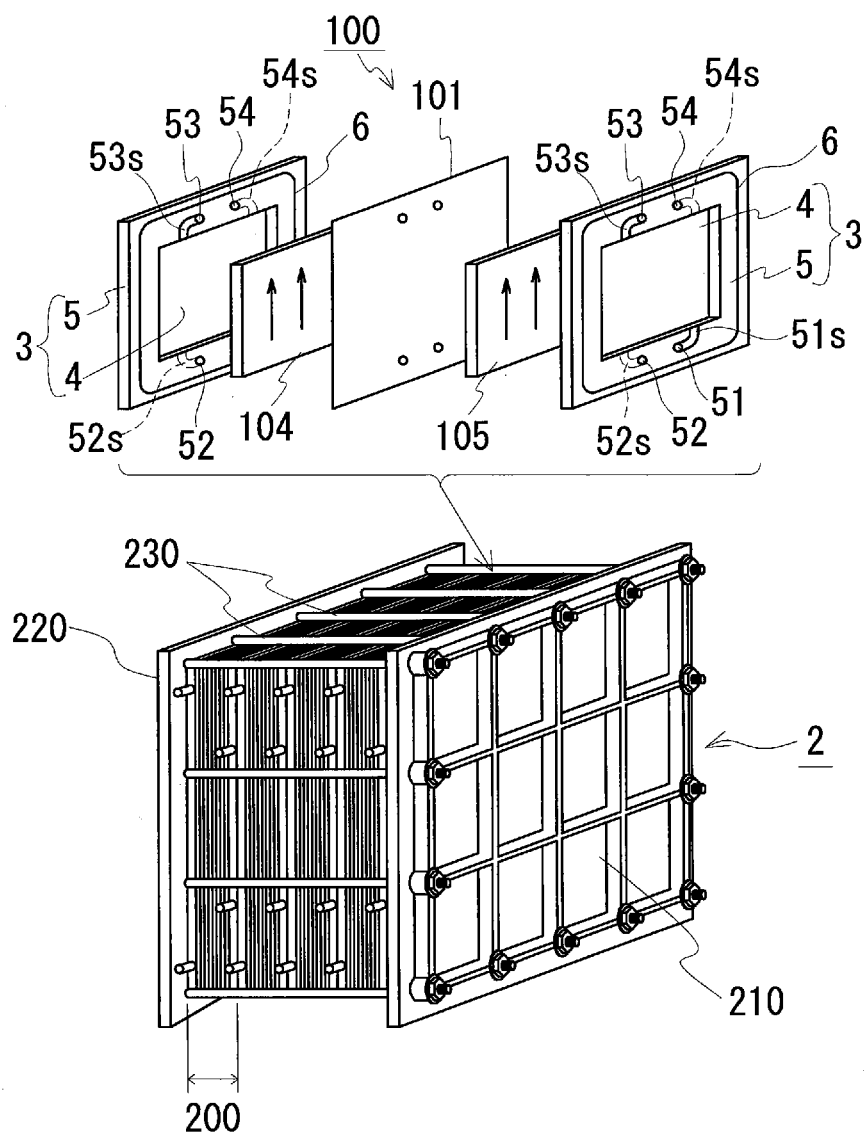
FIG. 3 is a schematic structural view of a cell stack according to the first embodiment.

Typically, the RF battery 1 is used in the form referred to as a cell stack 2 in which a plurality of the battery cells 100 are layered. As illustrated in FIG. 3, the cell stack 2 includes a layered body, a pair of end plates 210, 220, connecting members 230, and fastening members. The layered body is structured by repeatedly layering a certain cell frame 3, the positive electrode 104, the membrane 101, the negative electrode 105, and another cell frame 3. The layered body is interposed between the end plates 210, 220. The connecting members 230 connect the end plates 210, 220 to each other. The connecting members 230 are, for example, long bolts. The fastening members are, for example, nuts. The layered state of the layered body is maintained with a fastening force in the layer direction by fastening the end plates 210, 220 with the fastening members. A substack 200 includes a specified number of battery cells 100. The cell stack 2 is used in the form in which a plurality of the substacks 200 are layered. A supply/discharge plate (not illustrated) is disposed instead of a bipolar plate 4 in the cell frame 3 positioned at each end of the substacks 200 or the cell stack 2 in the layer direction of the battery cells 100.

[The Cell Frame]

The cell frame 3 includes, as illustrated in FIGS. 2 and 3, the bipolar plate 4 and a frame body 5. The frame body 5 is provided at an outer periphery of the bipolar plate 4. The bipolar plate 4 is disposed between the positive electrode 104 and the negative electrode 105. The bipolar plate 4 includes a conductive member that allows electric current to flow therethrough and that is impermeable to the electrolytes. The positive electrode 104 is disposed on one surface side of the bipolar plate 4 so as to be in contact with the bipolar plate 4, and the negative electrode 105 is disposed on the other surface side of the bipolar plate 4 so as to be in contact with the bipolar plate 4. The frame body 5 forms therein a region that serves the battery cell 100. Specifically, the thickness of the frame body 5 is larger than that of the bipolar plate 4. Accordingly, when the frame body 5 surrounds the outer periphery of the bipolar plate 4, a level difference is formed so as to form a space in which the positive electrode 104 (negative electrode 105) is disposed between a front surface side (rear surface side) of the bipolar plate 4 and a front surface side (rear surface side) of the frame body 5. In the substack 200 (cell stack 2), each of the battery cells 100 is formed between the bipolar plates 4, 4 of the adjacent cell frames 3, 3.

The positive electrolyte and the negative electrolyte are each supplied to a corresponding one of the positive electrode 104 and the negative electrode 105 through liquid supply manifolds 51, 52 and liquid supply guide grooves 51s, 52s formed at one piece (bottom side in the page of FIG. 3) out of pieces of the frame body 5 of the cell frame 3 facing each other. The positive electrolyte and the negative electrolyte are each discharged from a corresponding one of the positive electrode 104 and the negative electrode 105 through liquid discharge manifolds 53, 54 and liquid discharge guide grooves 53s, 54s formed at the other piece (top side in the page of FIG. 3) of the pieces of the frame body 5 facing each other. The positive electrolyte is supplied to the positive electrode 104 from the liquid supply manifold 51 through the liquid supply guide groove 51s formed on one surface side (front side of the page of FIG. 3) of the frame body 5. Then, as indicated by arrows in an upper view of FIG. 3, the positive electrolyte flows from the bottom to the top of the positive electrode 104 and is discharged to the liquid discharge manifold 53 through the liquid discharge guide groove 53s formed on the one surface side (front side of the page of FIG. 3) of the frame body 5. Supply and discharge of the negative electrolyte are performed in the same way as those of the positive electrolyte except for that the negative electrolyte is supplied and discharged on the other surface side (back side of the page) of the frame body 5. Ring-shaped sealing members 6 (FIGS. 2 and 3) such as O rings or flat packings are disposed between the frame bodies 5, thereby suppressing leakage of the electrolytes from the battery cell 100. Sealing grooves 6s (see FIG. 4) in which the ring-shaped sealing members 6 are disposed are formed in a circumferential direction in the frame body 5.

The above-described basic structures of the RF battery 1, the cell stack 2, and the cell frame 3 may be appropriately selected from known structures.

[Bipolar Plate]

A bipolar plate 4A according to the first embodiment is described with reference to FIGS. 4 and 5. This bipolar plate 4A corresponds to the above-described bipolar plate 4.

Figure 4:
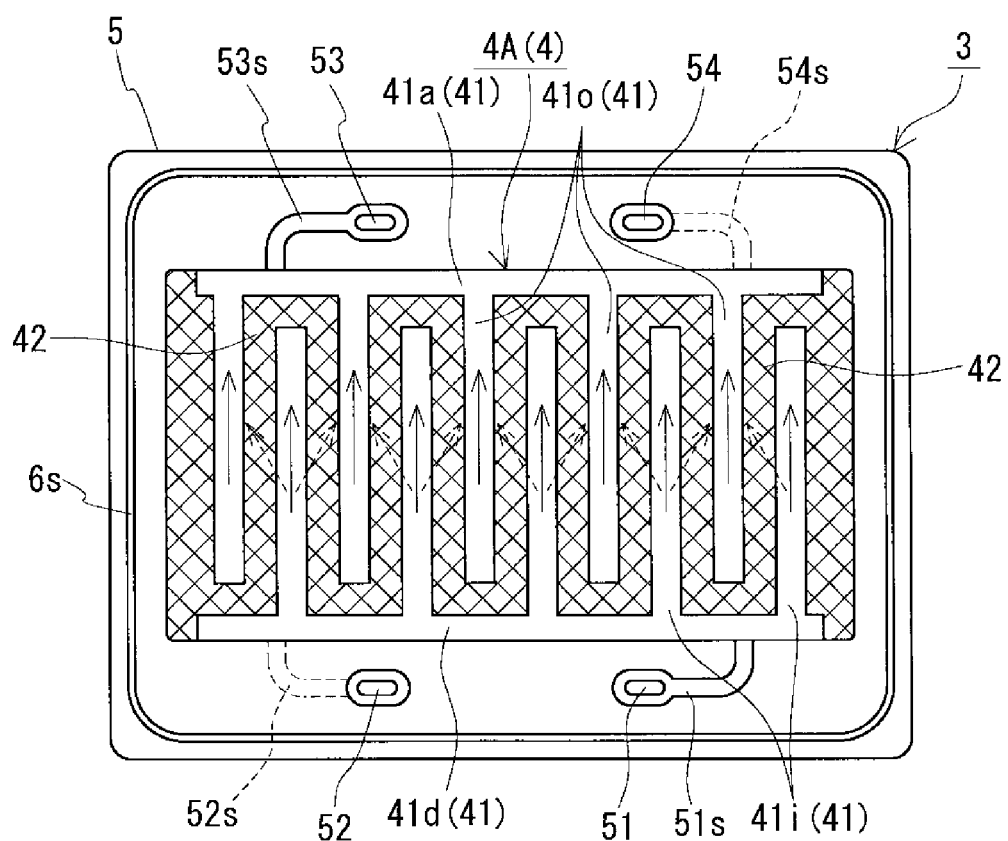
FIG. 4 is a schematic structural view of a cell frame according to the first embodiment seen from a one surface side.
Figure 5:
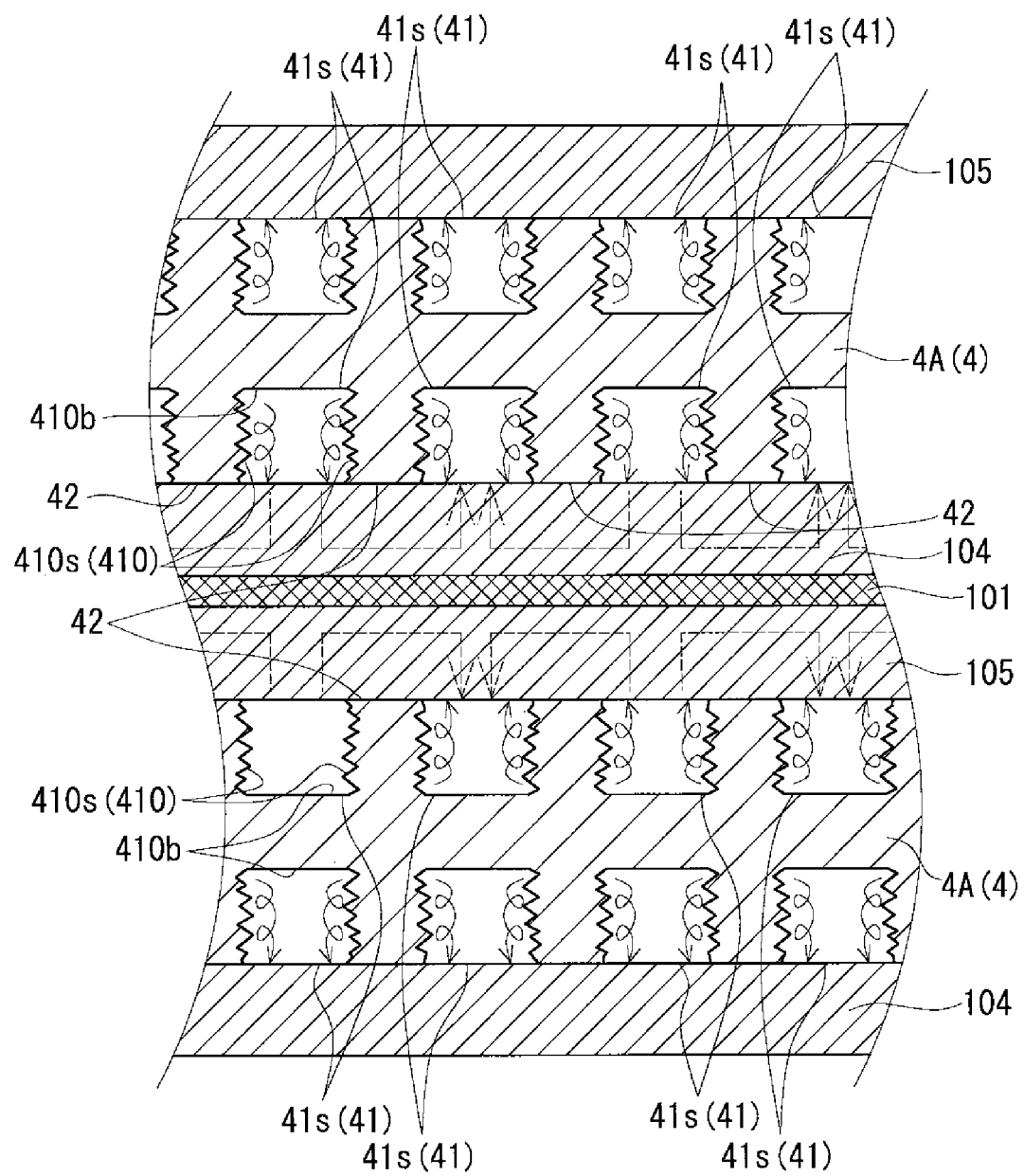
FIG. 5 is a schematic sectional view of a bipolar plate according to the first embodiment.

As illustrated in FIG. 4, the bipolar plate 4A is a rectangular flat plate. The positive electrode 104 of one of the battery cells 100 and the negative electrode 105 of the adjacent battery cell 100 are respectively disposed in the front surface and the rear surface of the bipolar plate 4A (see FIGS. 2 and 3). The bipolar plate 4A has a plurality of grooves 41 and a plurality of ridges 42, which are located between the adjacent grooves 41, 41 in the surface thereof facing the positive electrode 104 and the surface thereof facing the negative electrode 105. One of the characteristics of the bipolar plate 4A according to the first embodiment is that the bipolar plate 4A includes rough surfaces 410 (FIG. 5) disposed in at least part of a groove inner surface defining each of the grooves 41.

The plurality of grooves 41 function as channels through which the electrolytes flow. The positive electrolyte flows through the grooves 41 provided in the one surface of the bipolar plate 4A facing the positive electrode 104. The negative electrolyte flows through the grooves 41 provided in the other surface of the bipolar plate 4A facing the negative electrode 105. The flows of the electrolytes in the battery cells 100 can be adjusted by the shape, dimensions, and so forth of the grooves 41. In FIG. 4, the ridges 42 are crosshatched for convenience of description.

One of the characteristics of the present example is that the grooves 41 are non-communicating with one another in a direction from the one piece toward the other piece of the frame body 5 (up-down direction from the bottom to the top of the page of FIG. 4). The grooves 41 include introduction grooves 41i through which one of the electrolytes is introduced into a corresponding one of the electrodes and discharge grooves 41o through which the electrolyte is discharged from the electrode. Furthermore, the grooves 41 include a distribution groove 41d that is continuous with electrolyte inlets of all the introduction grooves 41i and provided in a direction in which the introduction grooves 41i are arranged. The distribution groove 41d communicates with the liquid supply manifold 51 (52) through the liquid supply guide groove 51s (52s) formed in the frame body 5. Furthermore, the grooves 41 include a collecting groove 41a that is continuous with electrolyte outlets of all the discharge grooves 41o and provided in a direction in which the discharge grooves 41o are arranged. The collecting groove 41a communicates with the liquid discharge manifold 53 (54) through the liquid discharge guide groove 53s (54s) formed in the frame body 5. The introduction grooves 41i and the discharge grooves 41o are independent of one another without communicating with one another and arranged in an alternating sequence at predetermined intervals so as to form, together with the distribution groove 41d and the collecting groove 41a, a facing comb-tooth structure. The ridges 42 are formed between the introduction grooves 41i and the adjacent discharge grooves 41o.

In the present example, the introduction grooves 41i and the discharge grooves 41o includes vertical grooves extending in the vertical direction of the bipolar plate 4A (up-down direction in FIG. 4). The distribution groove 41d and the collecting groove 41a include horizontal grooves extending in the horizontal direction of the bipolar plate 4A (left-right direction in FIG. 4). Alternatively, the grooves may be configured as follows: the introduction grooves and the discharge grooves include horizontal grooves extending in the horizontal direction of the bipolar plate, and the distribution groove and the collecting groove include vertical grooves extending in the vertical direction of the bipolar plate.

The ridges 42 are disposed between the adjacent grooves 41, 41 and form most of each of the outermost surfaces of the bipolar plate 4A. Thus, when the battery cell 100 has been assembled, the ridges 42 are in contact with the positive electrodes 104 and the negative electrode 105.

In the bipolar plate 4A, the electrolyte introduced from the liquid supply guide groove 51s (52s) into the distribution groove 41d is distributed to the introduction grooves 41i so as to spread over the entire surface of the bipolar plate 4A. The electrolyte flowing through the introduction grooves 41i penetrates into the electrode disposed on the surface of the bipolar plate 4A and flows to the discharge grooves 41o adjacent to the introduction grooves 41i beyond the surface of the bipolar plate 4A. The electrolyte flowing through the discharge grooves 41o is collected at the collecting groove 41a and discharged from the liquid discharge guide groove 53s (54s). In a duration from the introduction of the electrolyte into the liquid supply guide groove 51s (52s) to the discharge of the electrolyte to the liquid discharge guide groove 53s (54s), the electrolyte flowing through the grooves 41 penetrates into and is diffused in the electrode facing the bipolar plate 4A so as to perform battery reaction in the electrode. Flows of the electrolyte on the bipolar plate 4A having the plurality of grooves 41 includes flows along the introduction grooves 41i and the discharge grooves 41o (directions indicated by solid arrows illustrated in FIG. 4) and flows crossing in the width direction (left-right direction in FIG. 4) through the ridges 42 between the introduction grooves 41i and the discharge grooves 41o (directions indicated by dotted arrows illustrated in FIG. 4).

The grooves 41 each have a bottom surface 410b and side surfaces 410s that connect the bottom surface 410b to the surface of the bipolar plate 4A (ridges 42). The groove 41 has a rectangular shape in section. The side surfaces 410s of the groove 41 are formed by the rough surfaces 410.

The surface roughness of the rough surfaces 410 represented by arithmetic mean roughness Ra is greater than or equal to 0.1 μm. When the side surfaces 410s defining the groove 41 are formed by the rough surfaces 410, the flow rate of the electrolyte varies due to small level differences of the rough surfaces 410 in the case where the electrolyte flows along the groove 41. This can generate turbulence in the electrolyte. The occurrences of turbulence in the electrolyte in the groove 41 can improve diffusion of the electrolyte, and the electrolyte flowing near the bottom surface 410b of the groove 41 is also easily supplied to and easily penetrates into the electrode. Thus, battery reactivity can be improved. Ease of generating turbulence increases as the surface roughness of the rough surfaces 410 increases. Thus, the surface roughness of the rough surfaces 410 represented by the arithmetic mean roughness Ra is more preferably 0.2 μm or larger and particularly preferably 0.4 μm or larger.

Meanwhile, the surface roughness of the rough surfaces 410 represented by the arithmetic mean roughness Ra is preferably 25 μm or smaller. The positive electrode 104 and the negative electrode 105 disposed on the surfaces of the bipolar plate 4A typically include a porous material including fiber. Accordingly, when the bipolar plate 4A includes the rough surfaces 410, the fiber included in the positive electrode 104 or the negative electrode 105 may be caught on the small level differences of the rough surfaces 410. When the positive electrode 104 and the negative electrode 105 are compressed due to a pressure difference between the polarities, the positive electrode 104 or the negative electrode 105 enters the groove 41 in the case where the fiber is caught on the inside of the groove 41. This reduces the volume of the groove 41 and increases pressure loss. Meanwhile, when the surface roughness of the rough surfaces 410 represented by the arithmetic mean roughness Ra is 25 μm or smaller, the likelihood of the fiber being caught on the inside of the groove 41 can reduce. This allows the volume of the groove 41 to be easily ensured and the increase in pressure loss to be suppressed. Furthermore, when the surface roughness of the rough surfaces 410 represented by the arithmetic mean roughness Ra is 25 μm or smaller, even in the case where the fiber is caught on the inside of the groove 41 during the assembly of the battery cell 100, the caught fiber is easily released. Furthermore, when the surface roughness of the rough surfaces 410 represented by the arithmetic mean roughness Ra is 25 μm or smaller, an increase in flow resistance of the electrolyte flowing along the groove 41 can be suppressed, and an increase in temperature of the electrolyte due to frictional heat generated between the electrolyte and the rough surfaces 410 can also be suppressed. The arithmetic mean roughness Ra of the rough surfaces 410 is more preferably 20 μm or smaller, yet more preferably 10 μm or smaller, yet more preferably 6.4 μm or smaller, yet more preferably 3.2 μm or smaller, and particularly preferably 1.6 μm or smaller.

In the present example, the rough surfaces 410 are formed entirely in the side surfaces 410s defining the groove 41. It is sufficient that the side surfaces 410s be at least partially formed by the rough surfaces 410. For example, it is sufficient that the rough surfaces 410 be formed only in top portions (near opening of the groove 41) or only in bottom portions (near the bottom surface 410b) of the side surfaces 410s. Furthermore, the rough surfaces 410 may be formed partially in the longitudinal direction of the groove 41. When the rough surfaces 410 are formed from the bottom to top of the side surfaces 410s and throughout the length in the longitudinal direction of the groove 41, turbulence is more easily generated uniformly in the electrolyte flowing along the groove 41 and the electrolyte is supplied to and penetrates into the positive electrode 104 or the negative electrode 105 more easily.

The sectional shape of the groove 41 is not limited to a rectangle and may be any shape such as a semi-circle, a U-shape, a V-shape, or the like. Whatever shape the groove 41 has, turbulence can be generated in the electrolyte flowing along the groove 41 when the groove inner surface defining the groove 41 is at least partially formed by the rough surface 410.

Examples of the depth of the groove 41 include a depth that is 5% or larger and 45% or smaller of the thickness of the bipolar plate 4A. The reason for this is to sufficiently ensure the volume of the groove 41 and suppress reduction of the strength of the bipolar plate 4A. When the grooves 41 are provided in both the front and rear surfaces of the bipolar plate 4A, excessively large depth of the grooves 41 may reduce the mechanical strength. Accordingly, the depth of the groove 41 is more preferably 20% or larger and 40% or smaller of the thickness of the bipolar plate 4A. When the grooves 41 are provided in both the front and rear surfaces of the bipolar plate 4A, in plan view of the bipolar plate 4A, the grooves 41 may be provided at positions superposed on each other (see FIG. 5), at positions partially superposed on each other, or at positions not superposed on each other.

The width of the groove 41 can be appropriately selected in accordance with the depth of the groove 41 to sufficiently increase the cross-sectional area. For example, the width of the groove 41 can be 0.1 mm or larger and 10 mm or smaller, and further, 0.5 mm or larger and 2.5 mm or smaller. Furthermore, the intervals between the adjacent grooves 41, that is, the width of the ridges 42 can be 100% or larger and 700% or smaller of the width of the groove 41, and further, 200% or larger and 500% or smaller of the width of the groove 41. Although the introduction grooves 41i, the discharge grooves 41o, the distribution groove 41d, and the collecting groove 41a have the same width in the present example, the widths of the introduction grooves 41i, the discharge grooves 41o, the distribution groove 41d, and the collecting groove 41a may be different from one another.

The bipolar plate 4A can be formed of a material that allows electric current to pass therethrough and that is impermeable to the electrolytes. Furthermore, preferably, the material of the bipolar plate 4A has acid resistance and an appropriate stiffness. Examples of the material of the bipolar plate 4A include, for example, an electroconductive plastic formed of graphite and a polyolefin-based organic compound or a chlorinated organic compound. The material may be an electroconductive plastic in which at least one of carbon black and diamond like carbon substitutes for part of the graphite. Examples of the polyolefin-based organic compound include polyethylene, polypropylene, polybutene, and the like. Examples of the chlorinated organic compound include vinyl chloride, chlorinated polyethylene, chlorinated paraffin, and the like. With the bipolar plate 4A formed of such a material, the bipolar plate 4A can have a reduced electrical resistance and has a good acid resistance.

The bipolar plate 4A can be manufactured by forming the above-described material into a plate by using a known method such as injection molding, pressing, or vacuum forming and forming the grooves 41 and the ridges 42. The grooves 41 can be formed in a flat plate material having no groove 41 by, for example, cutting.

In order to form the rough surfaces 410 on the groove inner surfaces of the grooves 41, rough surfaces can be formed in regions of a mold or die corresponding to the grooves 41 when the material is formed into a plate by injection molding, pressing, or the like. The surface roughness of the rough surfaces formed in the mold or die represented by the arithmetic mean roughness Ra is about 0.1 μm or larger and 25 μm or smaller. Accordingly, demolding is possible even after the rough surfaces 410 have been formed in the groove inner surfaces of the grooves 41. Alternatively, the rough surfaces 410 can be formed in the groove inner surfaces by abrasive blasting performed on the groove inner surfaces of the grooves 41 after only the grooves 41 have been formed.

Second Embodiment

Figure 6:
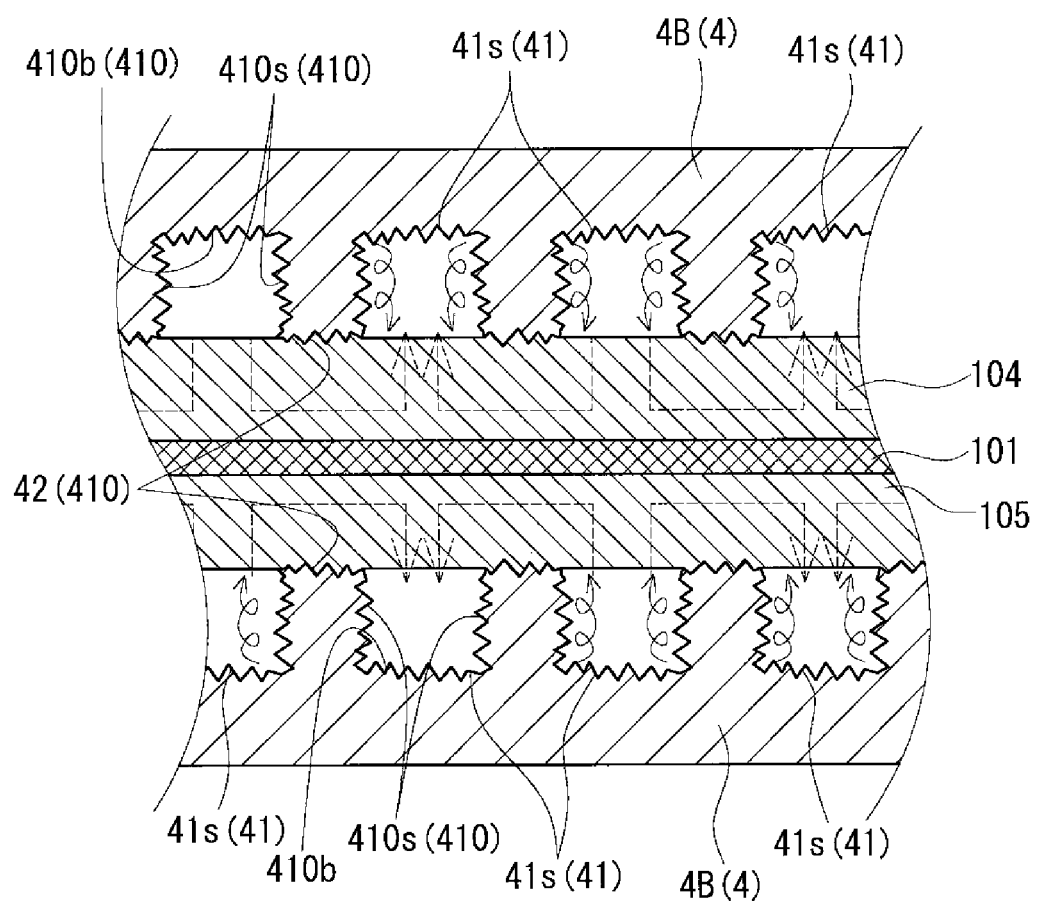
FIG. 6 is a schematic sectional view of a bipolar plate according to a second embodiment.

A bipolar plate 4B according to a second embodiment is described with reference to FIG. 6.

One of the characteristics of the bipolar plate 4B according to the second embodiment is that the entirety of the groove inner surfaces defining the grooves 41 are provided with the rough surfaces 410, and the ridges 42 are also provided with the rough surfaces 410. The difference between the bipolar plate 4A according to the first embodiment and the bipolar plate 4B according to the second embodiment is that the bottom surfaces 410b of the grooves 41 and the ridges 42 are formed by the rough surfaces 410. Other structures of the bipolar plate 4B according to the second embodiment are similar to those of the bipolar plate 4A according to the first embodiment. The rough surfaces 410 provided in the ridges 42 have substantially the same surface roughness as that of the rough surfaces 410 provided in the groove inner surfaces of the grooves 41.

When the groove inner surface of each of the grooves 41 is entirely provided with the rough surfaces 410, turbulence is more easily generated uniformly in the electrolyte flowing along the groove 41, diffusion of the electrolyte can be further improved, and the electrolyte is supplied to and penetrates into the positive electrode 104 or the negative electrode 105 more easily. Thus, battery reactivity can be further improved. In this case, surface roughness of the side surfaces 410s may be the same or different from the surface roughness of the bottom surface 410b.

When the ridges 42 are provided with the rough surfaces 410, turbulence can also be generated in the electrolyte flowing such that the electrolyte crosses the ridges 42, and diffusion of the electrolyte into the positive electrode 104 or the negative electrode 105 facing the ridges 42 can be improved. Thus, battery reactivity can be further improved. Furthermore, most of each of the outermost surfaces of the bipolar plate 4B is formed by the ridges 42. Accordingly, when the ridges 42 are provided with the rough surfaces 410, the fiber included in the positive electrode 104 or the negative electrode 105 can be caught on the small level differences of the rough surfaces 410. This can prevent the positive electrode 104, the negative electrode 105, and the bipolar plate 4B from being misaligned with one another during the assembly of the battery cell 100. Thus, good assemblability is obtained. When the ridges 42 are provided with the rough surfaces 410, the rough surfaces 410 may be provided throughout the widths of the ridges 42 or parts of the ridges 42 in the width direction.

When the entirety of the groove inner surfaces of the grooves 41 and the entire surfaces of the ridges 42 are provided with the rough surfaces 410, in the case where the rough surfaces 410 are formed by abrasive blasting, the entire surfaces of the bipolar plate 4B can be subjected to the abrasive blasting. Thus, good workability is obtained.

Third Embodiment

Figure 7:
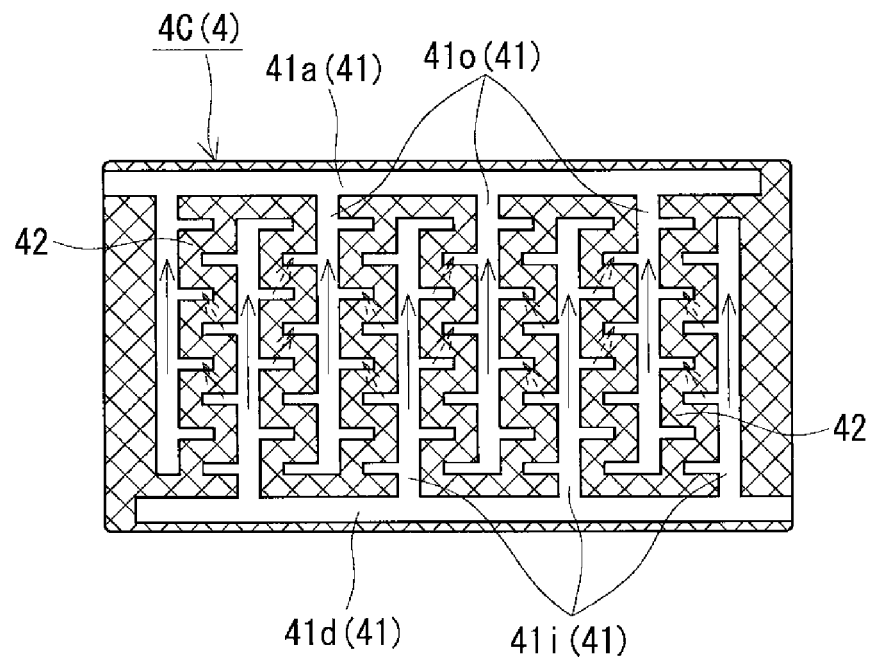
FIG. 7 is a schematic plan view of a bipolar plate according to a third embodiment.

A bipolar plate 4C according to a third embodiment is described with reference to FIG. 7.

One of the characteristics of the bipolar plate 4C is that the grooves 41 are arranged in the facing comb-tooth structure (see the first embodiment), and the introduction grooves 41i and the discharge grooves 410 project toward the ridges 42. The introduction grooves 41i include trunk grooves (vertical grooves) extending in the vertical direction of the bipolar plate 4C (up-down direction in FIG. 7) and branch grooves (horizontal grooves) continuous with the trunk grooves and extending in the horizontal direction of the bipolar plate 4C (left-right in FIG. 7). The discharge grooves 410 include trunk grooves extending in the vertical direction of the bipolar plate 4C and branch grooves continuous with the trunk grooves and extending in the horizontal direction of the bipolar plate 4C. In the present example, the width of the branch grooves is smaller than the width of the trunk grooves. The ridges 42 are formed between the trunk grooves of the introduction grooves 41i and the trunk grooves of the adjacent discharge grooves 41o. Furthermore, portions facing one another in the vertical direction of the bipolar plate 4C (up-down direction in FIG. 7) are formed between the branch grooves of the introduction grooves 41i and the adjacent branch grooves of the discharge grooves 41o. The ridges 42 are also formed in these portions. Also with the bipolar plate 4C, the electrolyte introduced from the liquid supply guide groove 51s (52s) illustrated in FIG. 4 into the distribution groove 41d forms flows along the introduction grooves 41i and the discharge grooves 410 (directions indicated by solid arrows illustrated in FIG. 7) and flows crossing the ridges 42 between the introduction grooves 41i and the discharge grooves 410 (directions indicated by dotted arrows illustrated in FIG. 7). In the present example, there are many flows of the electrolyte crossing the ridges 42. Thus, battery reaction is performed more easily than with the first embodiment. The groove inner surfaces of the grooves 41 are at least partially provided with the rough surfaces 410 (see FIGS. 5 and 6).

Fourth Embodiment

Figure 8:
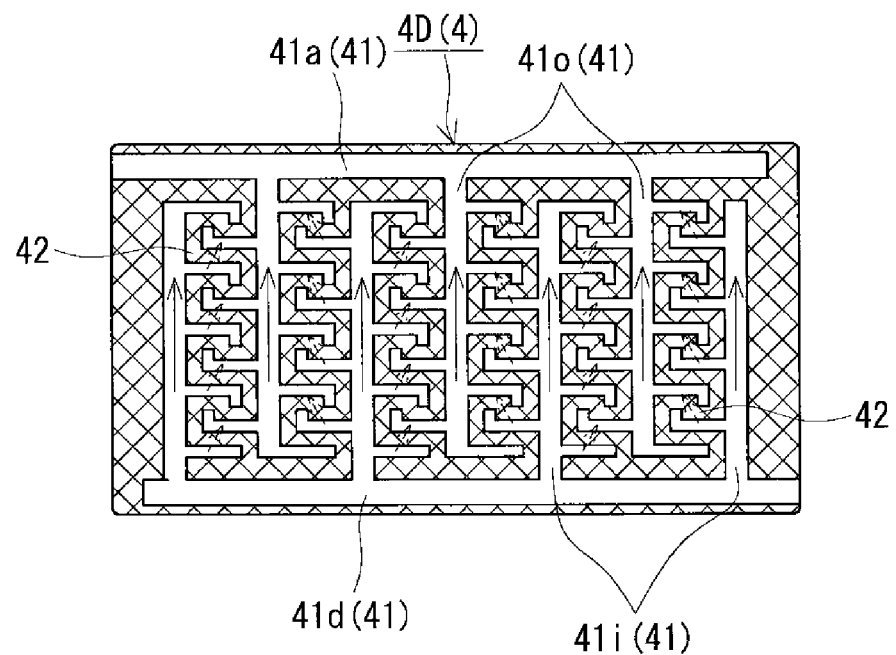
FIG. 8 is a schematic plan view of a bipolar plate according to a fourth embodiment.

A bipolar plate 4D according to a fourth embodiment is described with reference to FIG. 8.

One of the characteristics of the bipolar plate 4D is that the grooves 41 are arranged in the facing comb-tooth structure (see the first embodiment), and the introduction grooves 41i and the discharge grooves 410 project toward the ridges 42 and are bent at distal ends thereof. The introduction grooves 41i include trunk grooves (vertical grooves) extending in the vertical direction of the bipolar plate 4D (up-down direction in FIG. 8) and branch grooves (horizontal grooves) continuous with the trunk grooves and extending in the horizontal direction of the bipolar plate 4D (left-right direction in FIG. 8). The discharge grooves 410 include trunk grooves extending in the vertical direction of the bipolar plate 4D and branch grooves continuous with the trunk grooves and extending in the horizontal direction of the bipolar plate 4D. In the present example, the width of the branch grooves is smaller than the width of the trunk grooves. The distal end portions of the branch grooves are bent into an L shape. The directions in which the distal end portions of the introduction grooves 41i are bent and the directions in which the distal end portions of the discharge grooves 410 are bent face each other. The ridges 42 are formed between the trunk grooves of the introduction grooves 41i and the trunk grooves of the adjacent discharge grooves 41o. Furthermore, portions facing one another in the vertical direction of the bipolar plate 4D (up-down direction in FIG. 8) are formed between the branch grooves of the introduction grooves 41i and the adjacent branch grooves of the discharge grooves 41o. The ridges 42 are also formed in these portions. Also with the bipolar plate 4D, the electrolyte introduced from the liquid supply guide groove 51s (52s) illustrated in FIG. 4 into the distribution groove 41d forms flows along the introduction grooves 41i and the discharge grooves 410 (directions indicated by solid arrows illustrated in FIG. 8) and flows crossing the ridges 42 between the introduction grooves 41i and the discharge grooves 410 (directions indicated by dotted arrows illustrated in FIG. 8). Also in the present example, there are many flows of the electrolyte crossing the ridges 42. Thus, battery reaction is performed easily similarly to the third embodiment. The groove inner surfaces of the grooves 41 are at least partially provided with the rough surfaces 410 (see FIGS. 5 and 6).

<<Variations>>

The grooves 41 of the bipolar plate having the facing comb-tooth structure according to the first, third, or fourth embodiment may be arranged in the following forms (not illustrated).

(1) The introduction grooves 41i and the discharge grooves 410 face one another and are spaced from one another in the direction in which the electrolyte flows instead of being arranged in an alternating sequence such that the introduction grooves 41*i* and the discharge grooves 41*o* are interdigitated with one another.

(2) Either or both the introduction grooves 41*i* and the discharge grooves 41*o* are not continuous and have a plurality of cut grooves. For example, each of the introduction grooves or the discharge grooves are a group of a plurality of grooves spaced from one another in the longitudinal direction thereof.

Fifth Embodiment

Figure 9:
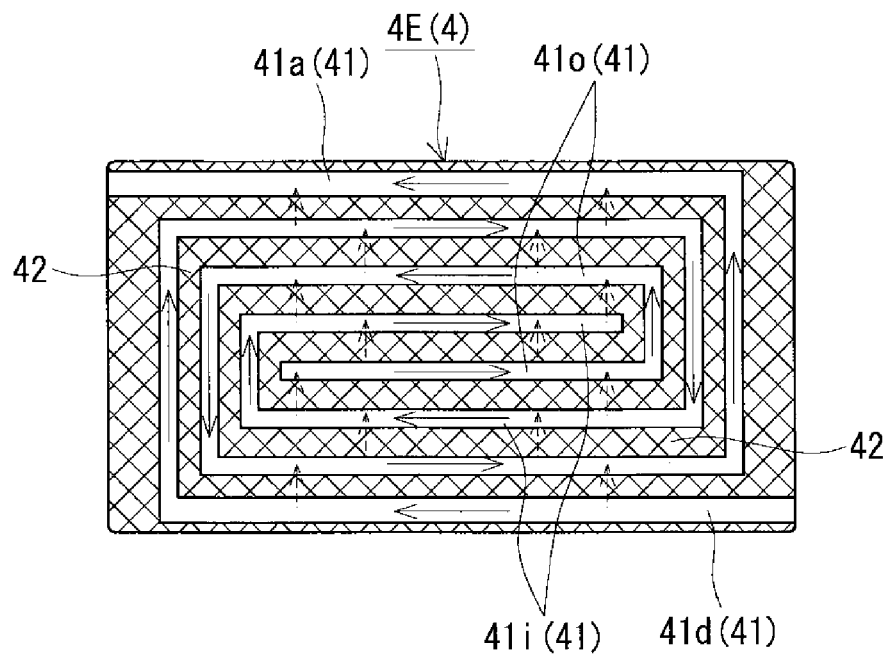
FIG. 9 is a schematic plan view of a bipolar plate according to a fifth embodiment.

A bipolar plate 4E according to a fifth embodiment is described with reference to FIG. 9.

One of the characteristics of the bipolar plate 4E is that the grooves 41 include the introduction grooves 41*i* that are helically arranged and the discharge grooves 41*o* that are helically arranged, and the introduction grooves 41*i* and the discharge grooves 41*o* are non-communicating with each other. In the present example, the width of the introduction grooves 41*i* and the width of the discharge grooves 41*o* are the same. Furthermore, the width of a horizontal groove (distribution groove 41*d*) that communicates with the liquid supply manifold 51 (52) through the liquid supply guide groove 51*s* (52*s*) formed in the frame body 5 (FIG. 4) and the width of a horizontal groove (collecting groove 41*a*) that communicates with the liquid discharge manifold 53 (54) through the liquid discharge guide groove 53*s* (54*s*) formed in the frame body 5 are the same. Furthermore, the widths of the introduction grooves 41*i* and the discharge grooves 41*o* are smaller than the widths of the distribution groove 41*d* and the collecting groove 41*a*. The grooves 41 has a helical shape in which the introduction grooves 41*i* and the adjacent discharge grooves 41*o* are interdigitated with each other. Thus, the ridges 42 are formed between the introduction grooves 41*i* and the discharge grooves 41*o* adjacent to one another in the horizontal direction of the bipolar plate 4E (left-right direction in FIG. 9) and between the introduction grooves 41*i* and the discharge grooves 41*o* adjacent to one another in the vertical direction of the bipolar plate 4E (up-down direction in FIG. 9). Also with the bipolar plate 4E, the electrolyte introduced from the liquid supply guide groove 51*s* (52*s*) into the bipolar plate 4E forms flows along the introduction grooves 41*i* and the discharge grooves 41*o* (directions indicated by solid arrows illustrated in FIG. 9) and flows crossing the ridges 42 between the introduction grooves 41*i* and the discharge grooves 41*o* (directions indicated by dotted arrows illustrated in FIG. 9). The groove inner surfaces of the grooves 41 are at least partially provided with the rough surfaces 410 (see FIGS. 5 and 6).

Sixth Embodiment

Figure 10:
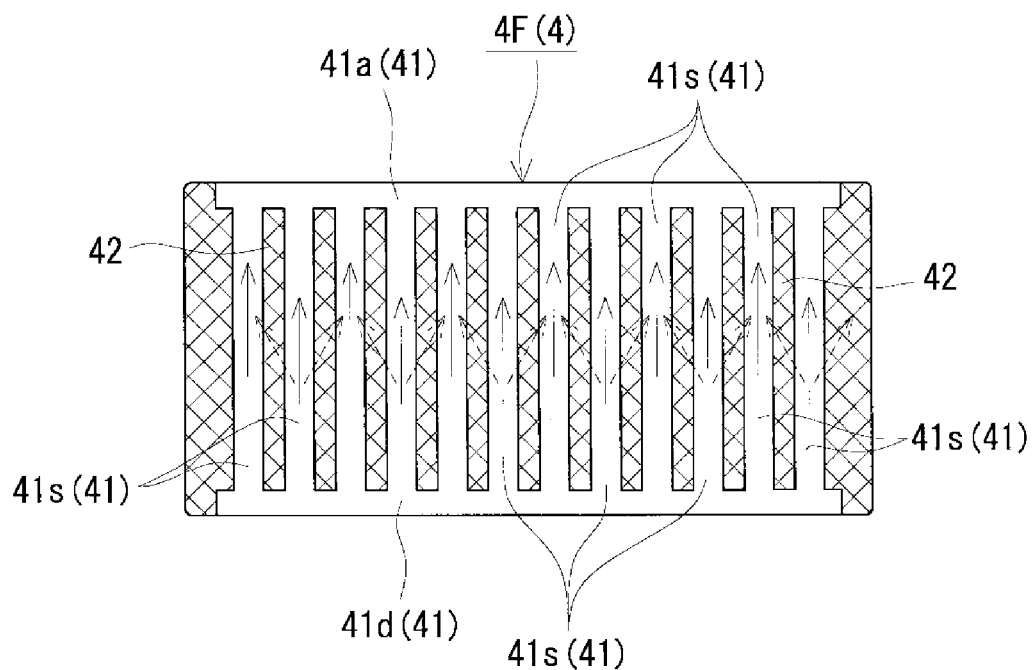
FIG. 10 is a schematic plan view of a bipolar plate according to a sixth embodiment.

A bipolar plate 4F according to a sixth embodiment is described with reference to FIG. 10.

One of the characteristics of the bipolar plate 4F is that the grooves 41 include vertical grooves 41*s* extending from the one piece toward the other piece of the frame body 5 (FIG. 4; up-down direction from the bottom to the top of the page of FIG. 4).

Furthermore, the grooves 41 include the distribution groove 41*d* that is continuous with electrolyte inlets of all the vertical grooves 41*s* and provided in a direction in which the vertical grooves 41*s* are arranged. The distribution groove 41*d* communicates with the liquid supply manifold 51 (52) through the liquid supply guide groove 51*s* (52*s*) formed in the frame body 5 (FIG. 4). Furthermore, the grooves 41 include the collecting groove 41*a* that is continuous with electrolyte outlets of all the vertical grooves 41*s* and provided in a direction in which the vertical grooves 41*s* are arranged. The collecting groove 41*a* communicates with the liquid discharge manifold 53 (54) through the liquid discharge guide groove 53*s* (54*s*) formed in the frame body 5 (FIG. 4). In the present example, the widths of the vertical grooves 41*s*, the distribution groove 41*d*, and the collecting groove 41*a* are the same.

In the bipolar plate 4F, the electrolyte introduced from the liquid supply guide groove 51*s* (52*s*) illustrated in FIG. 4 into the distribution groove 41*d* is distributed to the vertical grooves 41*s* so as to spread over the entire surface of the bipolar plate 4F. The electrolyte flowing through the vertical grooves 41*s* is collected at the collecting groove 41*a* and discharged from the liquid discharge guide groove 53*s* (54*s*). In a duration from the introduction of the electrolyte into the liquid supply guide groove 51*s* (52*s*) to the discharge of the electrolyte to the liquid discharge guide groove 53*s* (54*s*), the electrolyte flowing through the grooves 41 penetrates into and is diffused in the electrode facing the bipolar plate 4F so as to perform battery reaction in the electrode. Flows of the electrolyte in the bipolar plate 4F include flows along the vertical grooves 41*s* (directions indicated by solid arrows illustrated in FIG. 10) and flows crossing the ridges 42 between the adjacent vertical grooves 41*s* (directions indicated by dotted arrows illustrated in FIG. 10). The groove inner surfaces of the grooves 41 are at least partially provided with the rough surfaces 410 (see FIGS. 5 and 6).

Seventh Embodiment

A bipolar plate 4G according to a seventh embodiment is described with reference to FIG. 11.

One of the characteristics of the bipolar plate 4G is that the groove 41 is formed to have a continuous serpentine shape in a direction from the one piece toward the other piece of the frame body 5 (FIG. 4; up-down direction from the bottom to the top of the page of FIG. 4). The groove 41 includes the plurality of horizontal grooves 41*t* that are arranged and the plurality of vertical grooves 41*s* having a small length. The horizontal grooves 41*t* are connected to one another by the vertical grooves 41*s* at first ends and at second ends in an alternating sequence. Alternatively, the groove may have a continuous serpentine shape including a plurality of vertical grooves that are arranged and a plurality of horizontal grooves having a small length. In this case, the vertical grooves are connected to one another by the horizontal grooves at first ends and at second ends in an alternating sequence.

Figure 11:
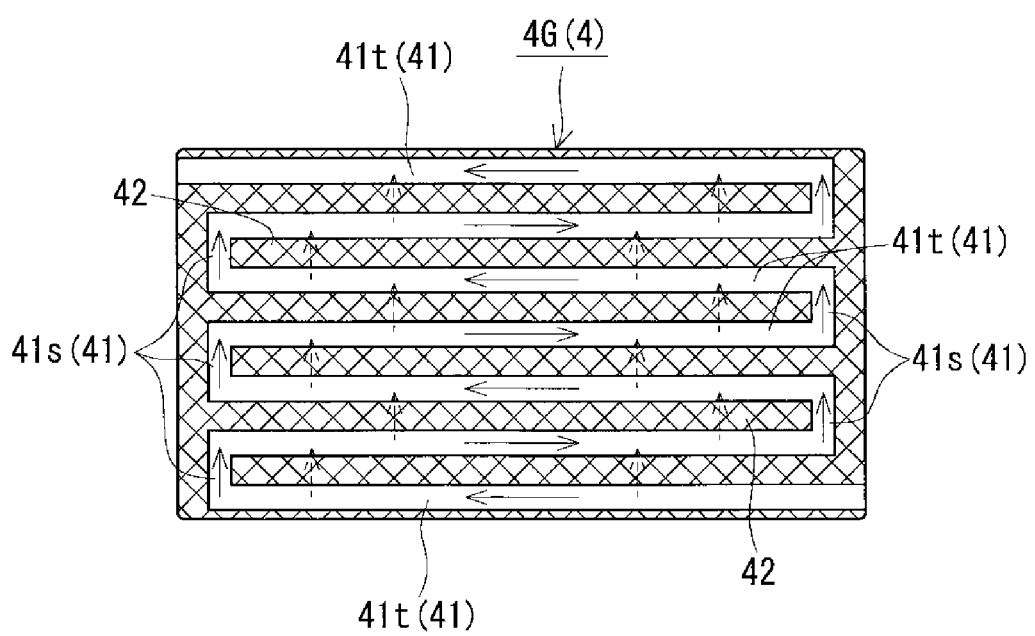
FIG. 11 is a schematic plan view of a bipolar plate according to a seventh embodiment.

With the bipolar plate 4G, the electrolyte introduced from the liquid supply guide groove 51*s* (52*s*) illustrated in FIG. 4 into the bipolar plate 4G forms flows along the groove 41 (directions indicated by solid arrows illustrated in FIG. 11) and flows crossing the ridges 42 between the horizontal grooves 41*t*, 41*t* (directions indicated by dotted arrows illustrated in FIG. 11). The groove inner surface of the groove 41 is at least partially provided with the rough surfaces 410 (see FIGS. 5 and 6).

Testing Example 1

A plurality of RF batteries were made (testing samples A to G). Cell frames (FIG. 4) that include a bipolar plate having an interdigital facing comb-tooth structure are used for the RF batteries. In the interdigital facing comb-shaped structure, introduction grooves and discharge grooves non-communicating with one another are interdigitated with one another and arranged in an alternating sequence. Specifications of the RF batteries in use will be described below. In the testing example 1, a single-cell RF battery is used in which a battery cell formed by superposing a positive electrode, a membrane, and a negative electrode on one another is interposed between cell frames including a bipolar plate. Bipolar plates used for the testing samples have grooves having a rectangular shape in cross-sectional view and side surfaces defining the grooves are entirely formed by rough surfaces illustrated in Table 1 (see FIG. 5).

Bipolar Plate

Dimensions: length; 150 mm, width; 158 mm, thickness; 6.0 mm

Shape of groove: interdigital facing comb-tooth shape including introduction grooves and discharge grooves (see FIG. 4)

Introduction Grooves and Discharge Grooves

Quantities: 10 introduction grooves×10 discharge grooves

Length: 110 mm

Overlapping length of comb teeth: 100 mm

Width of grooves: 0.5 mm

Depth of grooves: 0.5 mm

Sectional shape of grooves: rectangle

Width of ridges (distance between grooves): 2.5 mm

Distribution Groove and Collecting Groove

Length: 100 mm

Material: bipolar plate formed by compacting 50% by mass of graphite and 50% by mass of polypropylene as matrix resin Electrode Dimensions: length; 100 mm, width; 100 mm, thickness; 2.5 mm Material: carbon felt containing carbon fiber and binder carbon Membrane Material: Nafion (registered trademark) 212 made by E.I. du Pont de Nemours and Company Electrolyte Composition: sulfuric acid V aqueous solution (V concentration: 2.0 mol/L, sulfuric acid concentration: 5.0 mol/L)

Flow rate: 300 mL/min

<<Cell Resistivity>>

Cell resistivity of each of the testing samples was measured by performing charge and discharge testing with the testing samples. The conditions of the charge and discharge testing are as follows: end-of-discharge voltage: 1V; end-of-charge voltage: 1.6 V; and current: 25 A. The cell resistivity was evaluated as follows: a charge and discharge curve was drawn in accordance with the charge and discharge testing. The cell resistivity at a third cycle from the charge and discharge curve was evaluated. The results are illustrated in Table 1.

<<Pressure Loss>>

Pressure loss of each of the testing samples was measured. The pressure loss was evaluated as follows: pressure gages were attached in close proximity to an electrolyte inlet and an electrolyte outlet of the battery cell, the difference in measured pressure between the electrolyte inlet and the electrolyte outlet when the electrolyte flowed was measured, and this difference in measured pressure was evaluated. The results are illustrated in Table 1.

TABLE 1

| Testing sample | Rough surface: surface roughness Ra (μm) | Cell resistivity (Ω · cm$^2$) | Pressure Loss (kPa) |
| --- | --- | --- | --- |
| A | 0.05 | 0.80 | 5.5 |
| B | 0.1 | 0.72 | 5.6 |
| C | 1 | 0.71 | 5.7 |
| D | 5 | 0.70 | 6.0 |
| E | 10 | 0.71 | 6.0 |
| F | 25 | 0.70 | 6.0 |
| G | 30 | 0.76 | 12.0 |

It is found from Table 1 that the cell resistivity can be reduced when the surface roughness Ra of the rough surfaces forming the side surfaces of the groove is 0.1 μm or larger. It is thought that the reason for this is that, when turbulence is generated in the electrolyte flowing along the groove, diffusion of the electrolyte is improved, and accordingly, the electrolyte is supplied to and penetrates into the electrode efficiently. However, it is also found that, when the surface roughness of the rough surfaces is 30 μm or larger, the cell resistivity increases and the pressure loss increases. It is thought that the reason for this is as follows: when the fiber of the electrode is caught on the inside of the groove during assembling of the electrode to the bipolar plate or the electrode is caught on the inside of the groove due to compression of the electrode because of the pressure difference between the polarities during operation of the RF battery, the electrode enters the groove, and accordingly, the volume of the groove cannot be ensured and the channel of the electrolyte is closed. Thus, the surface roughness of the rough surfaces is preferably 25 μm or smaller.

REFERENCE SIGNS LIST 1 redox flow battery (RF battery)
2 cell stack
3 cell frame
4, 4A, 4B, 4C, 4D, 4E, 4F, 4G bipolar plate
41 groove
410 rough surface
410s side surface 410b bottom surface
41i introduction groove 41o discharge groove
41d distribution groove 41a collecting groove
41s vertical groove 41t horizontal groove
42 ridge
5 frame body
51, 52 liquid supply manifold 53, 54 liquid discharge manifold
51s, 52s liquid supply guide groove 53s, 54s liquid discharge guide groove
6 sealing member 6s sealing groove
100 battery cell
101 membrane
102 positive electrode cell 103 negative electrode cell
104 positive electrode 105 negative electrode
100P positive electrolyte circulation mechanism 100N negative electrolyte circulation mechanism
106 positive electrolyte tank 107 negative electrolyte tank
108, 109, 110, 111 pipe
112, 113 pump
200 substack
210, 220 end plate
230 connecting member

The invention claimed is:

1. A redox flow battery comprising:
a cell stack,
wherein the cell stack comprises a cell frame,
wherein the cell frame comprises a bipolar plate and a frame body provided at an outer periphery of the bipolar plate,
wherein the bipolar plate is configured to be disposed between a positive electrode and a negative electrode of a redox flow battery,
wherein the bipolar plate has, in a surface of the bipolar plate configured to be facing at least one of the positive electrode and the negative electrode, a plurality of grooves through which an electrolyte flows and a ridge positioned between the adjacent grooves,
wherein the bipolar plate includes rough surfaces which are disposed in at least parts of side surfaces of groove inner surfaces defining the respective grooves and surface roughness of which represented by arithmetic mean roughness Ra is 0.1 μm or larger, and
wherein the surface roughness of the rough surfaces represented by the arithmetic mean roughness Ra is 20 μm or smaller.

2. The redox flow battery according to claim 1, further comprising:
another rough surface which is disposed in at least part of a surface of the ridge and surface roughness of which represented by the arithmetic mean roughness Ra is 0.1 μm or larger.

3. The redox flow battery according to claim 1, wherein the rough surfaces are formed from a bottom to a top of side surfaces defining the grooves and throughout the length in the longitudinal direction of the grooves.

4. The redox flow battery according to claim 1, wherein the surface roughness of the rough surfaces represented by the arithmetic mean roughness Ra is 10 μm or smaller.

5. The redox flow battery according to claim 1, wherein the surface roughness of the rough surfaces represented by the arithmetic mean roughness Ra is 6.4 μm or smaller.

6. The redox flow battery according to claim 1, wherein the surface roughness of the rough surfaces represented by the arithmetic mean roughness Ra is 3.2 μm or smaller.

7. The redox flow battery according to claim 1, wherein the surface roughness of the rough surfaces represented by the arithmetic mean roughness Ra is 1.6 μm or smaller.

8. The redox flow battery according to claim 1, wherein the surface roughness of the rough surfaces represented by the arithmetic mean roughness Ra is 1 μm or smaller.

9. The redox flow battery according to claim 1, wherein the bipolar plate includes rough surfaces which are disposed only in one or more parts of the side surfaces of groove inner surfaces defining the respective grooves.

10. The redox flow battery according to claim 1, wherein a depth of the groove is 5% or larger and 45% or smaller of a thickness of the bipolar plate.

11. The redox flow battery according to claim 1, wherein a width of the groove is 0.1 mm or larger and 10 mm or smaller.

* * * * *